United States Patent
Leigh (10) Patent No.: US 10,133,416 B2
(45) Date of Patent: Nov. 20, 2018

(54) SIGNAL DETECTION IN FREQUENCY DIVISION MODULATED TOUCH SYSTEMS

(71) Applicant: Tactual Labs Co., New York, NY (US)

(72) Inventor: Darren Laney Leigh, Round Hill, VA (US)

(73) Assignee: Tactual Labs Co., New York, NY (US)

( * ) Notice: Subject to any disclaimer, the term of this patent is extended or adjusted under 35 U.S.C. 154(b) by 2 days.

(21) Appl. No.: 15/199,395

(22) Filed: Jun. 30, 2016

(65) Prior Publication Data

US 2017/0329456 A1    Nov. 16, 2017

Related U.S. Application Data

(60) Provisional application No. 62/336,150, filed on May 13, 2016.

(51) Int. Cl.
*G06F 3/041* (2006.01)
*G06F 3/044* (2006.01)

(52) U.S. Cl.
CPC ............ G06F 3/0418 (2013.01); G06F 3/044 (2013.01); G06F 3/0412 (2013.01); *G06F 2203/04105* (2013.01); *G06F 2203/04108* (2013.01); *G06F 2203/04112* (2013.01)

(58) Field of Classification Search
CPC ...... G06F 3/0418; G06F 3/0412; G06F 3/044; G06F 2203/04105; G06F 2203/04112; G06F 2203/04108
See application file for complete search history.

(56) References Cited

U.S. PATENT DOCUMENTS

| 2014/0028577 A1* | 1/2014 | Krah | G06F 3/0416 345/173 |
| 2015/0109212 A1* | 4/2015 | Yao | G06F 3/044 345/173 |

* cited by examiner

*Primary Examiner* — Temesghen Ghebretinsae
*Assistant Examiner* — Yaron Cohen
(74) *Attorney, Agent, or Firm* — Adam Landa (57) ABSTRACT

A frequency division modulated touch detector having row and column conductors arranged such that the path of the row conductors cross the paths of the column conductors, and signal emitters associated with each row, the emitters being adapted to transmit a signal having a specific frequency and initial phase on each row conductor, and a receiver associated with each column to receive signals present on the column conductor. A signal processor is adapted to determine an in-phase and a quadrature component for each of the transmitted signal found in the received signals, and to project a vector representing the transmitted frequencies at their initial phase onto the respective in-phase and quadrature component to determine a measurement for each transmitted signal on each column, and create a heat map reflecting those measurements, the heat map thus containing data reflective of touch.

47 Claims, 3 Drawing Sheets

SIGNAL DETECTION IN FREQUENCY DIVISION MODULATED TOUCH SYSTEMS

This application is a non-provisional of U.S. Provisional Patent Application No. 62/336,150 filed May 13, 2016, the entire disclosure of which is incorporated herein by reference.

FIELD

The disclosed system and method relate in general to the field of user input, and in particular to improved signal detection in frequency division modulated touch systems.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

This application relates to user interfaces such as the fast multi-touch sensors and other interfaces disclosed in U.S. patent application Ser. No. 14/046,819 filed Oct. 4, 2013 entitled "Hybrid Systems And Methods For Low-Latency User Input Processing And Feedback," U.S. patent application Ser. No. 13/841,436 filed Mar. 15, 2013 entitled "Low-Latency Touch Sensitive Device," U.S. Patent Application No. 61/798,948 filed Mar. 15, 2013 entitled "Fast Multi-Touch Stylus," U.S. Patent Application No. 61/799,035 filed Mar. 15, 2013 entitled "Fast Multi-Touch Sensor With User-Identification Techniques," U.S. Patent Application No. 61/798,828 filed Mar. 15, 2013 entitled "Fast Multi-Touch Noise Reduction," U.S. Patent Application No. 61/798,708 filed Mar. 15, 2013 entitled "Active Optical Stylus," U.S. Patent Application No. 61/710,256 filed Oct. 5, 2012 entitled "Hybrid Systems And Methods For Low-Latency User Input Processing And Feedback," U.S. Patent Application No. 61/845,892 filed Jul. 12, 2013 entitled "Fast Multi-Touch Post Processing," U.S. Patent Application No. 61/845,879 filed Jul. 12, 2013 entitled "Reducing Control Response Latency With Defined Cross-Control Behavior," U.S. Patent Application No. 61/879,245 filed Sep. 18, 2013 entitled "Systems And Methods For Providing Response To User Input Using Information About State Changes And Predicting Future User Input," U.S. Patent Application No. 61/880,887 filed Sep. 21, 2013 entitled "Systems And Methods For Providing Response To User Input Using Information About State Changes And Predicting Future User Input," U.S. patent application Ser. No. 14/046,823 filed Oct. 4, 2013 entitled "Hybrid Systems And Methods For Low-Latency User Input Processing And Feedback," U.S. patent application Ser. No. 14/069,609 filed Nov. 1, 2013 entitled "Fast Multi-Touch Post Processing," and U.S. Patent Application No. 61/887,615 filed Oct. 7, 2013 entitled "Touch And Stylus Latency Testing Apparatus." The entire disclosures of those applications are incorporated herein by reference.

Throughout this disclosure, the terms "touch", "touches," "contact," "contacts" or other descriptors may be used to describe events or periods of time in which a user's finger, a stylus, an object or a body part is detected by the sensor. In some embodiments, these detections occur only when the user is in physical contact with a sensor, or a device in which it is embodied. In other embodiments, the sensor may be tuned to allow the detection of "touches" or "contacts" that are hovering a distance above the touch surface or otherwise separated from the touch sensitive device. Therefore, the use of language within this description that implies reliance upon sensed physical contact should not be taken to mean that the techniques described apply only to those embodiments; indeed, nearly all, if not all, of what is described herein would apply equally to "touch" and "hover" sensors. More generally, as used herein, the term "touch" refers to an act that can be detected by the types of sensors disclosed herein, thus, as used herein the term "hover" is but one type of "touch" in the sense that "touch" is intended herein. Other types of sensors can be utilized in connection with the embodiments disclosed herein, including a camera, a proximity sensor, an optical sensor, a turn-rate sensor, a gyroscope, a magnetometer, a thermal sensor, a pressure sensor, a force sensor, a capacitive touch sensor, a power-management integrated circuit reading, a keyboard, a mouse, a motion sensor, and the like.

The presently disclosed systems and methods provide systems and methods for designing, manufacturing and using capacitive touch sensors, and particularly capacitive touch sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. patent application Ser. No. 13/841,436, filed on Mar. 15, 2013 entitled "Low-Latency Touch Sensitive Device" and U.S. patent application Ser. No. 14/069,609 filed on Nov. 1, 2013 entitled "Fast Multi-Touch Post Processing." These applications contemplate capacitive FDM, CDM, or FDM/CDM hybrid touch sensors which may be used in connection with the presently disclosed sensors. In such sensors, touches are sensed when a signal from a row is coupled (increased) or decoupled (decreased) to a column and the result received on that column.

This disclosure will first describe the operation of fast multi-touch sensors to which the present systems and methods for design, manufacturing and use can be applied. Details of the presently disclosed frequency division modulated touch system and method are then described further below under the heading "Signal Detection."

As used herein, the phrase "touch event" and the word "touch" when used as a noun include a near touch and a near touch event, or any other gesture that can be identified using a sensor. In accordance with an embodiment, touch events may be detected, processed and supplied to downstream computational processes with very low latency, e.g., on the order of ten milliseconds or less, or on the order of less than one millisecond.

In an embodiment, the disclosed fast multi-touch sensor utilizes a projected capacitive method that has been enhanced for high update rate and low latency measurements of touch events. The technique can use parallel hardware and higher frequency waveforms to gain the above advantages. Also disclosed are methods to make sensitive and robust measurements, which methods may be used on transparent display surfaces and which may permit economical manufacturing of products which employ the technique. In this regard, a "capacitive object" as used herein could be a finger, other part of the human body, a stylus, or any object to which the sensor is sensitive. The sensors and methods disclosed herein need not rely on capacitance. With respect to, e.g., the optical sensor, such embodiments utilize photon tunneling and leaking to sense a touch event, and a "capacitive object" as used herein includes any object, such as a stylus or finger, that that is compatible with such sensing. Similarly, "touch locations" and "touch sensitive device" as used herein do not require actual touching contact between a capacitive object and the disclosed sensor.

Figure 1:
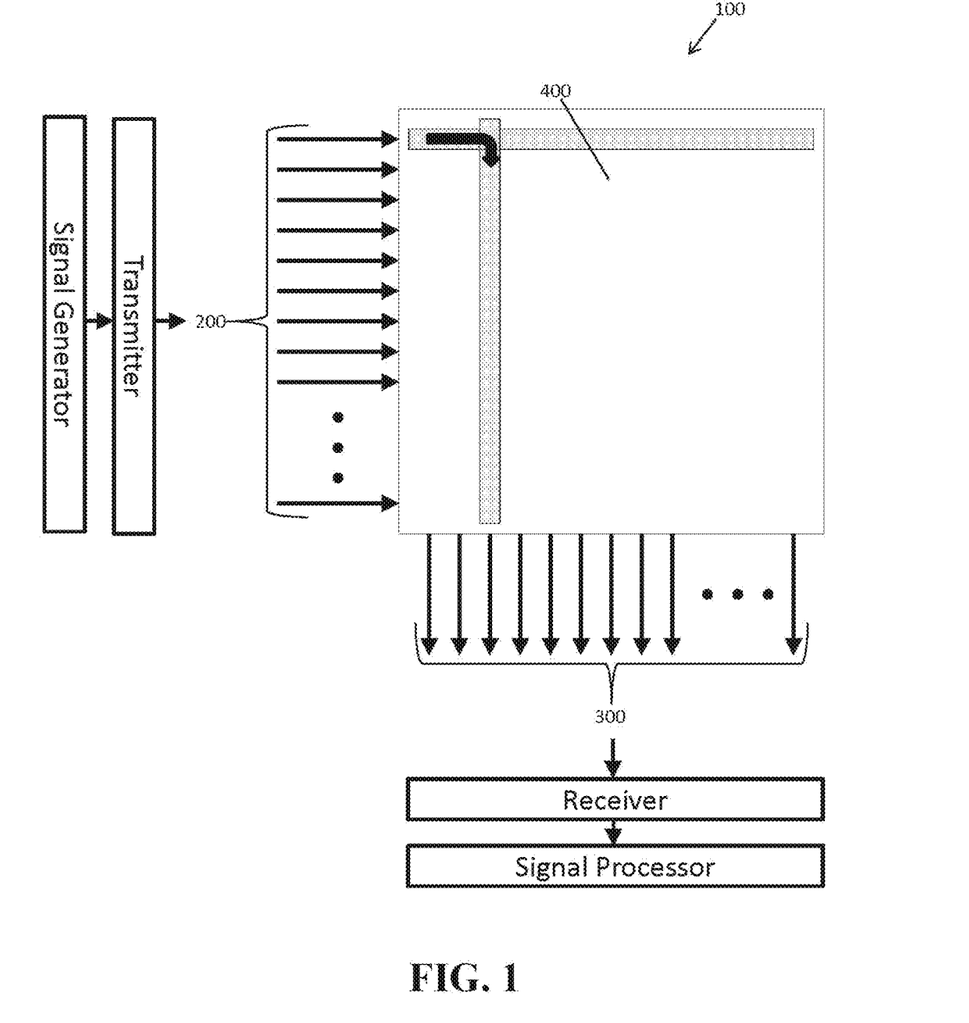
FIG. 1 provides a high level block diagram illustrating an embodiment of a low-latency touch sensor device.

FIG. 1 illustrates certain principles of a fast multi-touch sensor 100 in accordance with an embodiment. At reference no. 200, a different signal is transmitted into each of the surface's rows. The signals are designed to be "orthogonal", i.e., separable and distinguishable from each other. At reference no. 300, a receiver is attached to each column. The receiver is designed to receive any of the transmitted signals, or an arbitrary combination of them, with or without other signals and/or noise, and to individually determine a measure, e.g., a quantity for each of the orthogonal transmitted signals present on that column. The touch surface 400 of the sensor comprises a series of rows and columns (not all shown), along which the orthogonal signals can propagate. In an embodiment, the rows and columns are designed so that, when they are not subject to a touch event, a lower or negligible amount of signal is coupled between them, whereas, when they are subject to a touch event, a higher or non-negligible amount of signal is coupled between them. In an embodiment, the opposite could hold—having the lesser amount of signal represent a touch event, and the greater amount of signal represent a lack of touch. Because the touch sensor ultimately detects touch due to a change in the coupling, it is not of specific importance, except for reasons that may otherwise be apparent to a particular embodiment, whether the touch-related coupling causes an increase in amount of row signal present on the column or a decrease in the amount of row signal present on the column. As discussed above, the touch, or touch event does not require a physical touching, but rather an event that affects the level of coupled signal.

With continued reference to FIG. 1, in an embodiment, generally, the capacitive result of a touch event in the proximity of both a row and column may cause a non-negligible change in the amount of signal present on the row to be coupled to the column. More generally, touch events cause, and thus correspond to, the received signals on the columns. Because the signals on the rows are orthogonal, multiple row signals can be coupled to a column and distinguished by the receiver. Likewise, the signals on each row can be coupled to multiple columns. For each column coupled to a given row (and regardless of whether the coupling causes an increase or decrease in the row signal to be present on the column), the signals found on the column contain information that will indicate which rows are being touched simultaneously with that column. The quantity of each signal received is generally related to the amount of coupling between the column and the row carrying the corresponding signal, and thus, may indicate a distance of the touching object to the surface, an area of the surface covered by the touch and/or the pressure of the touch.

When a row and column are touched simultaneously, some of the signal that is present on the row is coupled into the corresponding column (the coupling may cause an increase or decrease of the row signal on the column). (As discussed above, the term touch or touched does not require actual physical contact, but rather, relative proximity.) Indeed, in various implementations of a touch device, physical contact with the rows and/or columns is unlikely as there may be a protective barrier between the rows and/or columns and the finger or other object of touch. Moreover, generally, the rows and columns themselves are not in touch with each other, but rather, placed in a proximity that allows an amount of signal to be coupled there-between, and that amount changes (positively or negatively) with touch. Generally, the row-column coupling results not from actual contact between them, nor by actual contact from the finger or other object of touch, but rather, by the capacitive effect of bringing the finger (or other object) into close proximity—which close proximity resulting in capacitive effect is referred to herein as touch.

The nature of the rows and columns is arbitrary and the particular orientation is irrelevant. Indeed, the terms row and column are not intended to refer to a square grid, but rather to a set of conductors upon which signal is transmitted (rows) and a set of conductors onto which signal may be coupled (columns). (The notion that signals are transmitted on rows and received on columns itself is arbitrary, and signals could as easily be transmitted on conductors arbitrarily named columns and received on conductors arbitrarily named rows, or both could arbitrarily be named something else.) Further, it is not necessary that the rows and columns be in a grid. Other shapes are possible as long as a touch event will touch part of a "row" and part of a "column", and cause some form of coupling. For example, the "rows" could be in concentric circles and the "columns" could be spokes radiating out from the center. And neither the "rows" nor the "columns" need to follow any geometric or spatial pattern, thus, for example, the keys on keyboard could be arbitrarily connected to form rows and columns (related or unrelated to their relative positions.) Moreover, it is not necessary for there to be only two types signal propagation channels: instead of rows and columns, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmission and sometimes supporting receipt. It is also contemplated that the signal propagation channels can simultaneously support transmitters and receivers—provided that the signals transmitted are orthogonal, and thus separable, from the signals received. Three or more types of antenna conductors may be used rather than just "rows" and "columns." Many alternative embodiments are possible and will be apparent to a person of skill in the art after considering this disclosure.

As noted above, in an embodiment the touch surface 400 comprised of a series of rows and columns, along which signals can propagate. As discussed above, the rows and columns are designed so that, when they are not being touched, one amount of signal is coupled between them, and when they are being touched, another amount of signal is coupled between them. The change in signal coupled between them may be generally proportional or inversely proportional (although not necessarily linearly proportional) to the touch such that touch is less of a yes-no question, and more of a gradation, permitting distinction between more touch (i.e., closer or firmer) and less touch (i.e., farther or softer)—and even no touch. Moreover, a different signal is transmitted into each of the rows. In an embodiment, each of these different signals are orthogonal (i.e., separable and distinguishable) from one another. When a row and column are touched simultaneously, signal that is present on the row is coupled (positively or negatively), causing more or less to appear in the corresponding column. The quantity of the signal that is coupled onto a column may be related to the proximity, pressure or area of touch.

A receiver 300 is attached to each column. The receiver is designed to receive the signals present on the columns, including of any of the orthogonal signals, or an arbitrary combination of the orthogonal signals, and any noise or other signals present. Generally, the receiver is designed to receive a frame of signals present on the columns, and to identify the columns providing signal. In an embodiment, the receiver (or a signal processor associated with the receiver data) may determine a measure associated with the quantity of each of the orthogonal transmitted signals present on that column during the time the frame of signals was captured. In this manner, in addition to identifying the rows in touch with each column, the receiver can provide additional (e.g., qualitative) information concerning the touch. In general, touch events may correspond (or inversely correspond) to received signals on the columns. For each column, the different signals received thereon indicate which of the corresponding rows is being touched in proximity with that column. In an embodiment, the amount of coupling between the corresponding row and column may indicate, e.g., the area of the surface covered by the touch, the pressure of the touch, etc. In an embodiment, a change in coupling over time between the corresponding row and column indicates a change in touch at the intersection of the two.

Simple Sinusoid Embodiment

In an embodiment, the orthogonal signals being transmitted onto the rows may be unmodulated sinusoids, each having a different frequency, the frequencies being chosen so that they can be distinguished from each other in the receiver. In an embodiment, frequencies are selected to provide sufficient spacing between them such that they can be more easily distinguished from each other in the receiver. In an embodiment, frequencies are selected such that no simple harmonic relationships exist between the selected frequencies. The lack of simple harmonic relationships may mitigate non-linear artifacts that can cause one signal to mimic another.

Generally, a "comb" of frequencies, where the spacing between adjacent frequencies is constant, and the highest frequency is less than twice the lowest, will meet these criteria if the spacing between frequencies, $\Delta f$, is at least the reciprocal of the measurement period $\tau$. For example, if it is desired to measure a combination of signals (from a column, for example) to determine which row signals are present once per millisecond ($\tau$), then the frequency spacing ($\Delta f$) must be greater than one kilohertz (i.e., $\Delta f > 1/\tau$). According to this calculation, in an example case with only ten rows, one could use the following frequencies:

Row 1: 5.000 MHz Row 6: 5.005 MHz
Row 2: 5.001 MHz Row 7: 5.006 MHz
Row 3: 5.002 MHz Row 8: 5.007 MHz
Row 4: 5.003 MHz Row 9: 5.008 MHz
Row 5: 5.004 MHz Row 10: 5.009 MHz

It will be apparent to one of skill in the art that frequency spacing may be substantially greater than this minimum to permit robust design. As an example, a 20 cm by 20 cm touch surface with 0.5 cm row/column spacing would require forty rows and forty columns and necessitate sinusoids at forty different frequencies. While a once per millisecond analysis rate would require only 1 KHz spacing, an arbitrarily larger spacing is utilized for a more robust implementation. In an embodiment, the arbitrarily larger spacing is subject to the constraint that the maximum frequency should not be more than twice the lowest (i.e., $f_{max} < 2(f_{min})$). Thus, in an exemplary embodiment, a frequency spacing of 100 kHz with the lowest frequency set at 5 MHz may be used, yielding a frequency list of 5.0 MHz, 5.1 MHz, 5.2 MHz, etc. up to 8.9 MHz.

In an embodiment, each of the sinusoids on the list may be generated by a signal generator and transmitted on a separate row by a signal emitter or transmitter. In an embodiment, the sinusoids may be pre-generated. To identify the rows and columns that are being simultaneously touched, a receiver receives any signals present on the columns and a signal processor analyzes the signal to determine which, if any, frequencies on the list appear. In an embodiment, the identification can be supported with a frequency analysis technique (e.g., Fourier transform), or by using a filter bank. In an embodiment, the receiver receives a frame of column signals, which frame is processed through an FFT, and thus, a measure is determined for each frequency. In an embodiment, the FFT provides an in-phase and quadrature measure for each frequency, for each frame.

In an embodiment, from each column's signal, the receiver/signal processor can determine a value (and in an embodiment an in-phase and quadrature value) for each frequency from the list of frequencies found in the signal on that column. In an embodiment, where the value corresponding to a frequency is greater or lower than some threshold, or changes from a prior value, that information is used to identify a touch event between the column and the row corresponding to that frequency. In an embodiment, signal strength information, which may correspond to various physical phenomena including the distance of the touch from the row/column intersection, the size of the touch object, the pressure with which the object is pressing down, the fraction of row/column intersection that is being touched, etc. may be used as an aid to localize the area of the touch event. In an embodiment, the determined values are not self-determinative of touch, but rather are further processed along with other values to determine touch events.

Once values for each of the orthogonal frequencies have been determined for at least two frequencies (corresponding to rows) or for at least two columns, a two-dimensional map can be created, with the value being used as, or proportional/inversely proportion to, a value of the map at that row/column intersection. In an embodiment, the signals' strengths are calculated for each frequency on each column. Once signal strengths are calculated a two-dimensional map may be created. In an embodiment, the signal strength is the value of the map at that row/column intersection. In an embodiment, values are determined for multiple row/column intersections on a touch surface to produce a map for the touch surface or region. In an embodiment, values are determined for every row/column intersection on a touch surface, or in a region of a touch surface, to produce a map for the touch surface or region. In an embodiment, due to physical differences in the touch surface at different frequencies, the signal values are normalized for a given touch or calibrated. Similarly, in an embodiment, due to physical differences across the touch surface or between the intersections, the signal values need to be normalized for a given touch or calibrated.

In an embodiment, touch events are identified using a map produced from the value information, and thus, take into account the value changes of neighboring row/column intersections. In an embodiment, the two-dimensional map data may be thresholded to better identify, determine or isolate touch events. In an embodiment, the two-dimensional map data may be used to infer information about the shape, orientation, etc. of the object touching the surface.

In an embodiment, such analysis and touch processing described herein may be performed on a touch sensor's discrete touch controller. In another embodiment, such analysis and touch processing may be performed on other computer system components such as but not limited to one or more ASIC, MCU, FPGA, CPU, GPU, SoC, DSP or dedicated circuit. The term "hardware processor" as used herein means any of the above devices or any other device (now known or hereinafter developed) which performs computational functions.

Returning to the discussion of the signals being transmitted on the rows, a sinusoid is not the only orthogonal signal that can be used in the configuration described above. Indeed, as discussed above, any set of signals that can be distinguished from each other will work. Nonetheless, sinusoids may have some advantageous properties that may permit simpler engineering and more cost efficient manufacture of devices which use this technique. For example, sinusoids have a very narrow frequency profile (by definition), and need not extend down to low frequencies, near DC. Moreover, sinusoids can be relatively unaffected by 1/f noise, which noise could affect broader signals that extend to lower frequencies.

In an embodiment, sinusoids may be detected by a filter bank. In an embodiment, sinusoids may be detected by frequency analysis techniques (e.g., Fourier transform/fast Fourier transform). Frequency analysis techniques may be implemented in a relatively efficient manner and may tend to have good dynamic range characteristics, allowing them to detect and distinguish between a large number of simultaneous sinusoids. In broad signal processing terms, the receiver's decoding of multiple sinusoids may be thought of as a form of frequency-division multiplexing. In an embodiment, other modulation techniques such as time-division and code-division multiplexing can also be used. Time division multiplexing has good dynamic range characteristics, but typically requires that a finite time be expended transmitting into (or analyzing received signals from) the touch surface. Code division multiplexing has the same simultaneous nature as frequency-division multiplexing, but may encounter dynamic range problems and may not distinguish as easily between multiple simultaneous signals.

As disclosed in U.S. patent application Ser. No. 13/841,436, entitled, "Low-Latency Touch Sensitive Device," a modulated sinusoid may be used in lieu of, and as an enhancement of, the simple sinusoid embodiment described above. The entire disclosure of the application is incorporated herein by reference.

Touch surfaces using the previously described techniques may have a relatively high cost associated with generating and detecting sinusoids compared to other methods. Below are discussed methods of generating and detecting sinusoids that may be more cost-effective and/or be more suitable for mass production.

Sinusoid Detection

In an embodiment, sinusoids may be detected in a receiver using a complete radio receiver with a Fourier Transform detection scheme. Such detection may require digitizing a high-speed RF waveform and performing digital signal processing thereupon. Separate digitization and signal processing may be implemented for every column of the surface; this permits the signal processor to discover which of the row signals are in touch with that column. In the above-noted example, having a touch surface with forty rows and forty columns, would require forty copies of this signal chain. Today, digitization and digital signal processing are relatively expensive operations, in terms of hardware, cost, and power. It would be useful to utilize a more cost-effective method of detecting sinusoids, especially one that could be easily replicated and requires very little power.

In an embodiment, sinusoids may be detected using a filter bank. A filter bank comprises an array of bandpass filters that can take an input signal and break it up into the frequency components associated with each filter. The Discrete Fourier Transform (DFT, of which the FFT is an efficient implementation) is a form of a filter bank with evenly-spaced bandpass filters that may be used for frequency analysis. DFTs may be implemented digitally, but the digitization step may be expensive. It is possible to implement a filter bank out of individual filters, such as passive LC (inductor and capacitor) or RC active filters. Inductors are difficult to implement well on VLSI processes, and discrete inductors are large and expensive, so it may not be cost effective to use inductors in the filter bank.

At lower frequencies (about 10 MHz and below), it is possible to build banks of RC active filters on VLSI. Such active filters may perform well, but may also take up a lot of die space and require more power than is desirable.

At higher frequencies, it is possible to build filter banks with surface acoustic wave (SAW) filter techniques. These allow nearly arbitrary FIR filter geometries. SAW filter techniques require piezoelectric materials which are more expensive than straight CMOS VLSI. Moreover, SAW filter techniques may not allow enough simultaneous taps to integrate sufficiently many filters into a single package, thereby raising the manufacturing cost.

In an embodiment, sinusoids may be detected using an analog filter bank implemented with switched capacitor techniques on standard CMOS VLSI processes that employs an FFT-like "butterfly" topology. The die area required for such an implementation is typically a function of the square of the number of channels, meaning that a 64-channel filter bank using the same technology would require only 1/256th of the die area of the 1024-channel version. In an embodiment, the complete receive system for the low-latency touch sensor is implemented on a plurality of VLSI dies, including an appropriate set of filter banks and the appropriate amplifiers, switches, energy detectors, etc. In an embodiment, the complete receive system for the low-latency touch sensor is implemented on a single VLSI die, including an appropriate set of filter banks and the appropriate amplifiers, switches, energy detectors, etc. In an embodiment, the complete receive system for the low-latency touch sensor is implemented on a single VLSI die containing n instances of an n-channel filter bank, and leaving room for the appropriate amplifiers, switches, energy detectors, etc.

Sinusoid Generation

Generating the transmit signals (e.g., sinusoids) in a low-latency touch sensor is generally less complex than detection, principally because each row requires the generation of a single signal (or a small number of signals) while the column receivers have to detect and distinguish between many signals. In an embodiment, sinusoids can be generated with a series of phase-locked loops (PLLs), each of which multiply a common reference frequency by a different multiple.

In an embodiment, the low-latency touch sensor design does not require that the transmitted sinusoids are of very high quality, but rather, may accommodate transmitted sinusoids that have more phase noise, frequency variation (over time, temperature, etc.), harmonic distortion and other imperfections than may usually be allowable or desirable in radio circuits. In an embodiment, the large number of frequencies may be generated by digital means and then employ a relatively coarse digital-to-analog conversion process. As discussed above, in an embodiment, the generated row frequencies should have no simple harmonic relationships with each other, any non-linearities in the generation process should not cause one signal in the set to "alias" or mimic another.

In an embodiment, a frequency comb may be generated by having a train of narrow pulses filtered by a filter bank, each filter in the bank outputting the signals for transmission on a row. The frequency "comb" is produced by a filter bank that may be identical to a filter bank that can be used by the receiver. As an example, in an embodiment, a 10 nanosecond pulse repeated at a rate of 100 kHz is passed into the filter bank that is designed to separate a comb of frequency components starting at 5 MHz, and separated by 100 kHz. The pulse train as defined would have frequency components from 100 kHz through the tens of MHz, and thus, would have a signal for every row in the transmitter. Thus, if the pulse train were passed through an identical filter bank to the one described above to detect sinusoids in the received column signals, then the filter bank outputs will each contain a single sinusoid that can be transmitted onto a row.

Transparent Display Surface

It may be desirable that the touch surface be integrated with a computer display so that a person can interact with computer-generated graphics and imagery. While front projection can be used with opaque touch surfaces and rear projection can be used with translucent ones, modern flat panel displays (LCD, plasma, OLED, etc.) generally require that the touch surface be transparent. In an embodiment, the present technique's rows and columns, which allow signals to propagate along them, need to be conductive to those signals. In an embodiment, the present technique's rows and columns, which allow radio frequency signals to propagate along them, need to be electrically conductive.

If the rows and columns are insufficiently conductive, the resistance per unit length along the row/column will combine with the capacitance per unit length to form a low-pass filter: any high-frequency signals applied at one end will be substantially attenuated as they propagate along the poor conductor.

Visually transparent conductors are commercially available (e.g., indium-tin-oxide or ITO), but the tradeoff between transparency and conductivity is problematic at the frequencies that may be desirable for some embodiments of the low-latency touch sensor described herein: if the ITO were thick enough to support certain desirable frequencies over certain lengths, it may be insufficiently transparent for some applications. In an embodiment, the rows and/or columns may be formed entirely, or at least partially, from graphene and/or carbon nanotubes, which are both highly conductive and optically transparent.

In an embodiment, the rows and/or columns may be formed from one or more fine wires that block a negligible amount of the display behind them. In an embodiment, the fine wires are too small to see, or at least too small to present a visual impediment when viewing a display behind it. In an embodiment, fine silver wires patterned onto transparent glass or plastic can be used to make up the rows and/or columns. Such fine wires need to have sufficient cross section to create a good conductor along the row/column, but it is desirable (for rear displays) that such wires are small enough and diffuse enough to block as little of the underlying display as appropriate for the application. In an embodiment, the fine wire size is selected on the basis of the pixels size and/or pitch of the underlying display.

As an example, the new Apple Retina displays comprises about 300 pixels per inch, which yields a pixel size of about 80 microns on a side. In an embodiment, a 20 micron diameter silver wire 20 centimeters long (the length of an iPad display), which has a resistance of about 10 ohms, is used as a row and/or column and/or as part of a row and/or column in a low-latency touch sensor as described herein. Such 20 micron diameter silver wire, however, if stretched across a retina display, may block up to 25% of an entire line of pixels. Accordingly, in an embodiment, multiple thinner diameter silver wires may be employed as a column or row, which can maintain an appropriate resistance, and provide acceptable response with respect to radiofrequency skin depth issues. Such multiple thinner diameter silver wires can be laid in a pattern that is not straight, but rather, somewhat irregular. A random or irregular pattern of thinner wires is likely to be less visually intrusive. In an embodiment, a mesh of thin wires is used; the use of a mesh will improve robustness, including against manufacturing flaws in patterning. In an embodiment, single thinner diameter wires may be employed as a column or row, provided that the thinner wire is sufficiently conductive to maintain an appropriate level resistance, and acceptable response with respect to radiofrequency skin depth issues.

As used below, for convenience of description, the terms transmitting conductor and receiving conductor will be used. The transmitting conductor may be a row or column carrying a signal e.g., from a signal generator. In this respect, "conductor" as used herein includes not only electrical conductors but other paths on which signals flow. A receiving conductor may be a row or column carrying a signal resulting from the coupling of a touch event when a touch event occurs in the proximity of the receiving conductor, and not carrying the signal resulting from the coupling of a touch event when no touch event occurs in the proximity of the receiving conductor. In an embodiment, a receiver/signal processor measures one or more quantities related to each of the orthogonal transmitted signal on a receiving conductor which signals change over time as a result of coupling (positive or negative) of a touch event. The measuring of the one or more quantities allows for identification of a touch event. In an embodiment, the receiver/signal processor may comprise a DSP, a filter bank, or a combination thereof. In an embodiment, the receiver/signal processor is a comb filter providing bands corresponding to the orthogonal signals.

Because any touch event in proximity to a row-column intersection may change both the row-signal present on the column, and the column-signal present on the row, in an embodiment, any signal on a column or row that does not have a corresponding row or column counterpart may be mitigated or rejected. In an embodiment, a row-signal received at a column receiver/signal processor is used in locating or identifying a touch event if a corresponding column-signal is received at a corresponding row receiver/signal processor. For example, a detected signal from Row R in Column C is only considered to be caused by a touch event if Column C's transmitted signal is also detected in Row R. In an embodiment, Column C and Row R simultaneously transmit signals that are orthogonal to the other row and column signals, and orthogonal to each other. In an embodiment, Column C and Row R do not simultaneously transmit signals, but rather, each transmits its signal in an allotted time slice. In such an embodiment, signals only require frequency- or code-orthogonality from other signals transmitted in the same time slice.

As illustrated, in an embodiment, a single signal generator may be used to generate the orthogonal signals for both the rows and the columns, and a single signal processor may be used to process the received signals from both the rows and the columns. In an embodiment, one signal generator is dedicated to generating row signals and a separate signal generator is dedicated to generating column signals. In an embodiment, a plurality of signal generators is dedicated to generating row signals and the same, or a separate plurality of signal generators is dedicated to generating column signals. Likewise, in an embodiment, one signal processor is dedicated to processing row signals and a separate signal processor is dedicated to processing column signals. In an embodiment, a plurality of signal processors are dedicated to processing row signals and the same, or a separate plurality of signal processors are dedicated to processing column signals.

In an embodiment, each row and each column may be associated with a signal, and the signal associated with each row or column is unique and orthogonal with respect to the signal for every other row or column. In such an embodiment, it may be possible to "transmit" all row and column signals simultaneously. Where design or other constraints require, or where it is desirable to use fewer than one signal per row and column, time division multiplexing may be employed.

As disclosed in U.S. patent application Ser. No. 14/603,104, filed Jan. 22, 2015, entitled "Dynamic Assignment of Possible Channels in a Touch Sensor," a system and method enables a touch sensor to reduce or eliminate such false or noisy readings and maintain a high signal-to-noise ratio, even if it is proximate to interfering electromagnetic noise from other computer system components or unwanted external signals. This method can also be used to dynamically reconfigure the signal modulation scheme governing select portions or the entire surface-area of a touch sensor at a given point in time in order to lower the sensor's total power consumption, while still optimizing the sensor's overall performance in terms of parallelism, latency, sample-rate, dynamic range, sensing granularity, etc. The entire disclosure of the application is incorporated herein by reference.

Fast Multi-Touch Post Processing

After the signal strengths from each row in each column have been calculated using, for example, the procedures described above, post-processing is performed to convert the resulting 2-D "heat map," also referred to as a "matrix," into usable touch events. In an embodiment, such post processing includes at least some of the following four procedures: field flattening, touch point detection, interpolation and touch point matching between frames. The field flattening procedure subtracts an offset level to remove crosstalk between rows and columns, and compensates for differences in amplitude between particular row/column combinations due to attenuation. The touch point detection procedure computes the coarse touch points by finding local maxima in the flattened signal. The interpolation procedure computes the fine touch points by fitting data associated with the coarse touch points to a paraboloid. The frame matching procedure matches the calculated touch points to each other across frames. Below, each of the four procedures is described in turn. Also disclosed are examples of implementation, possible failure modes, and consequences, for each processing step. Because of the requirement for very low latency, the processing steps should be optimized and parallelized.

A field flattening procedure may be used to reduce systematic issues that cause artifacts in each column's received signal strength. In an embodiment, these artifacts may be compensated-for as follows. First, because of cross-talk between the rows and columns, the received signal strength for each row/column combination will experience an offset level. To a good approximation, this offset level will be constant and can be subtracted (or added) off Second, the amplitude of the signal received at a column due to a calibrated touch at a given row and column intersection will depend on that particular row and column, mostly due to attenuation of the signals as they propagate along the row and column. The farther they travel, the more attenuation there will be, so columns farther from the transmitters and rows farther from the receivers will have lower signal strengths in the "heat map" than their counterparts. If the RF attenuation of the rows and columns is low, the signal strength differences may be negligible and little or no compensation will be necessary. If the attenuation is high, compensation may be necessary or may improve the sensitivity or quality of touch detection. Generally, the signal strengths measured at the receivers are expected to be linear with the amount of signal transmitted into the columns. Thus, in an embodiment, compensation will involve multiplying each location in the heat map by a calibration constant for that particular row/column combination. In an embodiment, measurements or estimates may be used to determine a heat map compensation table, which table can be similarly used to provide the compensation by multiplication. In an embodiment, a calibration operation is used to create a heat map compensation table. The term "heat map" as used herein does not require an actual map of heat, but rather the term can mean any array of at least two dimensions comprising data corresponding to locations.

In an exemplary embodiment, the entire field flattening procedure is as follows. With nothing touching the surface, first the signal strength for each row signal at each column receiver is measured. Because there are no touches, substantially the entire signal received is due to cross-talk. The value measured (e.g., the amount of each row's signal found on each column) is an offset level that needs to be subtracted from that position in the heat map. Then, with the constant offsets subtracted, a calibrated touch object is placed at row/column intersections and the signal strength of that row's signal at that column receiver is measured. In an embodiment, all row/column intersections are used for calibration. The signal processor may be configured to normalize the touch events to the value of one location on the touch surface. The location likely to have the strongest signals can be arbitrarily chosen (because it experiences the least attenuation), i.e., the row/column intersection closest to the transmitters and receivers. If the calibrated touch signal strength at this location is $S_N$ and the calibrated touch signal strength for each row and column is $S_{R,C}$ then, if each location in the heat map is multiplied by $(S_N/S_{R,C})$, all touch values will be normalized. In an embodiment, calibrated touches may cause the normalized signal strength for any row/column in the heat map to be equal to one.

Figure 2:
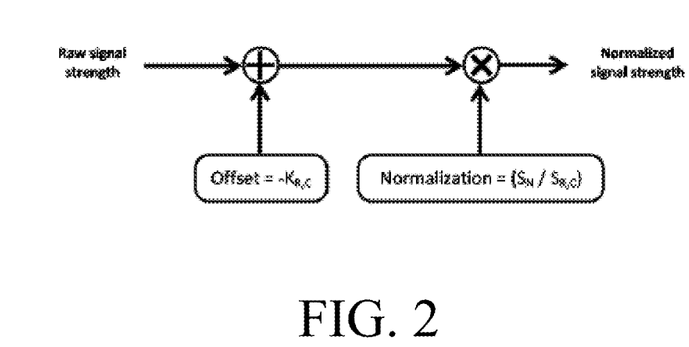
FIG. 2 shows a block diagram illustrating a field flattening procedure.

The field flattening procedure parallelizes well. Once the offsets and normalization parameters are measured and stored—which should only need to be done once (or possibly again at a maintenance interval)—the corrections can be applied as soon as each signal strength is measured. FIG. 2 illustrates an embodiment of a field flattening procedure.

In an embodiment, calibrating each row/column intersection may be required at regular or selected maintenance intervals. In an embodiment, calibrating each row/column intersection may be required once per unit. In an embodiment, calibrating each row/column intersection may be required once per design. In an embodiment, and particularly where, e.g., RF attenuation of the rows and columns is low, calibrating each row/column intersection may not be required at all. Moreover, in an embodiment where the signal attenuation along the rows and columns is fairly predictable, it may be possible to calibrate an entire surface from only a few intersection measurements.

If a touch surface does experience a lot of attenuation, the field flattening procedure will, at least to some degree, normalize the measurements, but it may have some side effects. For example, the noise on each measurement will grow as its normalization constant gets larger. It will be apparent to one of skill in the art, that for lower signal strengths and higher attenuations, this may cause errors and instability in the touch point detection and interpolation processes. Accordingly, in an embodiment sufficient signal strength is provided for the signal undergoing the largest attenuation (e.g., the farthest row/column intersection). In an embodiment, after the heat map is generated and the field flattened, touch points can be identified.

Use Duplication of Sensing to Increase the Sensor's Signal-to-Noise Ratio

A touch sensor can also utilize a number of techniques to decrease the influence of interference and other noise in the touch sensor. For example, in an embodiment for a touch sensor that employs FDM, a touch sensor could use multiple frequencies per row so that, even if the sensor cannot predict which frequency bins will be subject to interference, then it can measure each row (or column) in multiple ways and gauge the least noisy measurement (or combination of measurements), and then use those.

In cases where it is difficult to decide whether a measurement has been affected by interference or not, a touch sensor could employ a voting scheme whereby a voting plurality of measurements, or a similar statistical method, is used to determine which measurements to throw away, which to keep and the best way to statistically and mathematically combine the ones it keeps to maximize the signal-to-noise+interference ratio and thereby enhance the user experience. For example, in an embodiment, an FDM touch sensor subject to interference could transmit three different frequencies on each row, (where the frequencies are sufficiently separated so that interference between them is statistically unlikely) and measure the results. Then using a two-out-of-three voting system, the sensor can determine which of the frequencies has been degraded the most by interference and, either remove its measurement from consideration in the final measurement, or combine the remaining two in a statistically plausible manner (given what the sensor "knows" a priori about the interference and noise statistics) or include all three and combine them in a statistically plausible manner, weighting the influence of each frequency measurement by the statistical likelihood of its degradation by noise and interference.

Some methods that a touch sensor can employ in this manner include but are not limited to:

1. Using multiple frequencies per row. These frequencies could be employed simultaneously or in sequence.
2. Transmitting from rows to columns, and from columns to rows, which can also be combined with the use of multiple frequencies above or with another combination of modulation schemes.
3. Using CDMA on top of FDM, or some combination of modulation schemes. Here it should be noted that CDMA signals, unlike those commonly employed by FDM techniques, are fundamentally "unnatural" and therefore are often more immune than FDM modulation schemes to a variety of naturally-occurring signals in a computer system's external environment.

Improved Signal Detection

The presently disclosed frequency division modulated touch system is used for connection with a touch surface. A frequency division modulated touch system must determine the power (or amplitude) of received signals in order to determine whether a touch event has occurred. Power and amplitude have a functional or proportional relationship, meaning that when one changes the other changes in a predictable manner. Power is normally calculated by taking the sum-of-squares of the real and imaginary components of an FFT at the frequency of interest. The sum-of-squares operations require two scalar multiplications and an addition to determine the power of the estimated signal, as well as a subsequent square root operation to determine the amplitude.

It has been discovered that where the phase of the signal of interest is known, its amplitude can be estimated with higher signal-to-noise ratio (SNR) by projecting the complex FFT output at that frequency along the unit vector that has the known phase of the received signal. This discovery excludes noise that would normally be included in the sum-of-squares calculation, thereby increasing the SNR of amplitude estimation. In an embodiment, half of the noise included in the sum-of-squares calculation is excluded, resulting in an SNR improvement of 3 dB. Moreover, the novel method of amplitude estimation may be implemented using two scalar multiplications and an addition to determine the amplitude of the estimated signal. Thus, using the novel approach disclosed herein, both the SNR and the computational efficiency may be improved.

Figure 3:
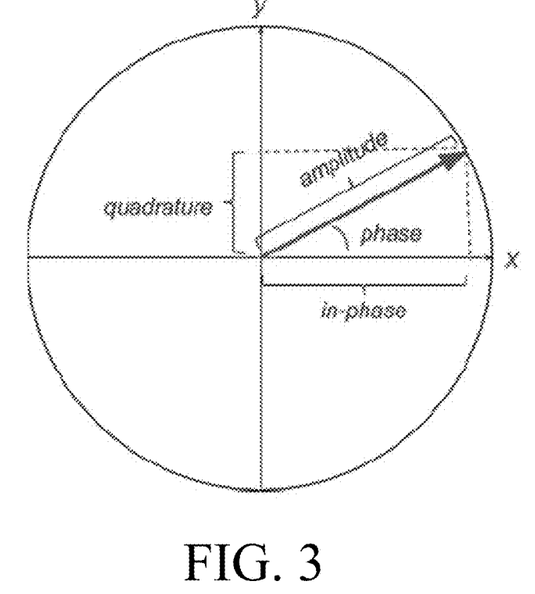
FIG. 3 shows the relationship between the in-phase and quadrature representation and the amplitude and phase representation.

The measurement of a particular signal at some frequency has two degrees of freedom; it is therefore a vector of length two. This can be expressed in polar coordinates as amplitude and phase (i.e., the magnitude and angle of the polar vector), but it can also be expressed in Cartesian coordinates, and usually is designated "in-phase" and "quadrature". See FIG. 3, which shows the relationship between the in-phase and quadrature representation and the amplitude and phase representation.

One of skill in the art will understand that the phase of a sinusoid is arbitrary because it depends on a particular reference point and time. Considering a chosen reference point, a cosine signal will be maximum at that point at time $t=0$, and will then decrease in amplitude. A sine signal will be zero at that point at time $t=0$ and will then increase in amplitude. A cosine signal is completely in-phase, meaning that its vector lies along the x-axis. A sine signal is completely quadrature, meaning that its vector lies along the y-axis. A signal with some other phase will have both in-phase and quadrature components, and its vector will lie between the axes.

Conversion between polar $(r, \varphi)$ and cartesian $(x, y)$ coordinates can be done as follows:

$$x = r\cos(\varphi) \quad r = hypot(x, y) = \sqrt{x^2 + y^2}$$

$$y = r\sin(\varphi) \quad \Phi = a\tan 2(y, x)$$

If the phase of a signal measurement is known, one of skill in the art can convert it to a different phase by rotating the vector to the desired phase. In polar coordinates this is trivial, because the phase difference can be added to the original phase. In Cartesian coordinates, a rotation matrix can be used to rotate the vector by the appropriate phase difference.

$$\begin{bmatrix} b_x \\ b_y \end{bmatrix} = \begin{bmatrix} \cos(\Delta\phi) & \sin(\Delta\phi) \\ -\sin(\Delta\phi) & \cos(\Delta\phi) \end{bmatrix} \begin{bmatrix} a_x \\ a_y \end{bmatrix}$$

Where $\Delta\phi$ is the phase difference by which the vector is rotated.

The output of a discrete Fourier transform, such as the FFT, is complex. Complex numbers are used as a mathematical convenience to express two-dimensional vectors. The real component represents the x or in-phase component of the vectors, and the imaginary component represents the y or quadrature component. Complex numbers can be used in exponential form, through Euler's formula:

$$e^{iu} = \cos(u) + i\,\sin(u)$$

An amplitude term r along with the phase term u can be included, which is sometimes referred to as a phasor:

$$re^{iu} = r\cos(u) + i\,r\sin(u)$$

The exponential form provides a method to multiply two of the vectors in a useful way.

$$re^{iu} \cdot se^{iv} = rs\, e^{i(u+v)}$$

This formula represents that the product of two vectors (or phasors) with amplitudes r and s, respectively, and phase angles u and v, respectively, is a vector with amplitude rs and a phase angle of u+v.

Discrete Fourier transforms have a certain relationship between patterns in their input and patterns in their output. Specifically, with $A(f) = \mathrm{DFT}(a(t))$:

| If the input is . . . | Then the output is . . . |
|---|---|
| Real, i.e., imag(a(t)) = 0 | Even/symmetric, i.e., A(f) = A(-f) |
| Imaginary, i.e., real(a(t)) = 0 | Odd/anti-symmetric, i.e., A(f) = -A(-f) |
| Complex | Neither even nor odd |
| Even/symmetric, i.e., a(t) = a(-t) | Real, i.e., imag(A(f)) = 0 |
| Odd/anti-symmetric, i.e., a(t) = -a(-t) | Imaginary, i.e., real(A(f)) = 0 |
| Neither even nor odd | Complex |

In FDM-based touch systems, such as those taught in U.S. patent application Ser. No. 15/099,179 filed 14 Apr. 2016 (the entire disclosure of which is incorporated herein by reference), the time domain data a(t) applied to the input of an FFT is real, but there is no constraint on it being even or odd. When the duplicated part is ignored, the outputs in the frequency domain are even and complex. The output frequency bin A(f) contains a real component (which is the in-phase or x component) and an imaginary component (which is the quadrature or y component). The total power in that bin can be computed by using the following:

$$\text{power in } A(f) = \text{real}(A(f))^2 + \text{imag}(A(f))^2$$

The phase, referenced to input bin a(t=0) of the FFT, is $$\text{phase of } A(f) = a\tan2(\text{imag}(A(f)), \text{real}(A(f)))$$

Because the touch systems described herein directly supply the transmitted signal, and because the transmitters and receivers are running in lock-step from the same clock, the phase of each row signal should always be constant as seen in each column receiver. Note that a touch on the touch sensor does effect the coupling between row and column and may have an effect on the phase. This effect is addressed later in a subsequent section herein.

The Effects of Noise

Figure 4:
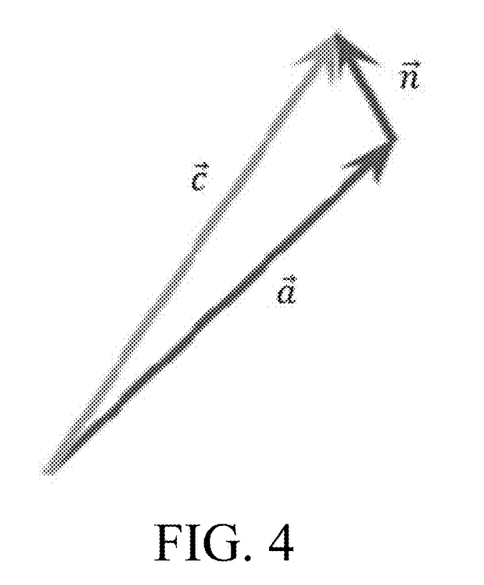
FIG. 4 shows the signal d corrupted by noise and interference n.

The receivers are associated with the columns, to receive column signals present on the columns. Further, the receivers on the touch systems described herein receive not only the deliberately transmitted row signals, but also noise and interference. The noise and interference is additive and is independent of the row signals and independent in each channel. It can be modeled as follows:

$$\vec{c} = \vec{a} + \vec{n}$$

Where $\vec{c}$, the corrupted signal, is the sum of $\vec{a}$, the deliberately generated row signal, and $\vec{n}$, the noise and interference. FIG. 4 shows a snapshot of the signal, $\vec{a}$, corrupted by noise and interference $\vec{n}$.

The noise will corrupt the signal in two different ways. First, the component of $\vec{n}$ that is parallel to $\vec{a}$ causes amplitude noise, i.e., changes in the amplitude of the sinusoidal signal. Second, the component of $\vec{n}$ that is perpendicular to $\vec{a}$ causes phase noise, i.e., changes in the phase of the sinusoidal signal. Note that, on average, half of the noise energy goes into amplitude noise and the other half goes into phase noise.

The above is strictly true only in the case of high signal-to-noise ratio. While the parallel component of $\vec{n}$ always translates into amplitude noise, the perpendicular adds mostly phase noise, but can also add some amplitude noise.

Figure 5:
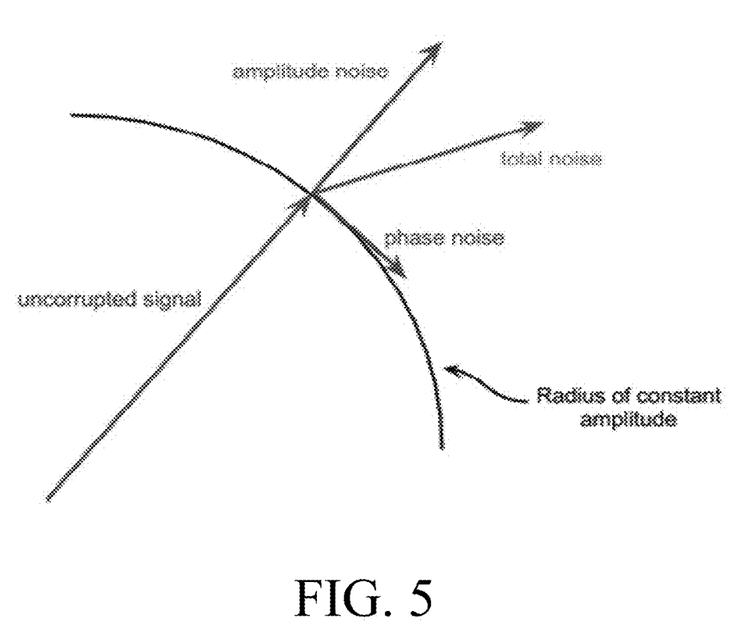
FIG. 5 shows total noise is divided into components that are parallel and perpendicular to the uncorrupted signal.

This is readily understood from FIG. 5. In FIG. 5, the total noise is separated into components that are parallel and perpendicular to the uncorrupted signal. The parallel component adds an error term to the amplitude of the original signal, and so causes "amplitude noise." The perpendicular component adds an error term to the phase of the original signal, and so causes "phase noise." Note that the perpendicular component does not exactly follow the radius of constant amplitude, along which the original signal would rotate if its phase changed. Meaning that, unless the perpendicular component is small compared to the amplitude of the original signal, it will contribute amplitude noise as well.

If the perpendicular component is small compared to the amplitude of the uncorrupted signal, it will follow the radius of constant amplitude, meaning that it will add phase noise but not amplitude noise. However, if it gets large enough to deviate substantially from the radius of constant curvature, then it will also contribute amplitude noise along with phase noise.

Implications for FDM Touch Systems

Touch systems that use frequency division multiplexing (FDM), such as FMT, are prone to additive noise and interference as described above. The signal processing chain normally computes an FFT that provides a complex output at each frequency of interest, and the power can be calculated by taking the sum of the squares of the real and imaginary components. To produce the amplitude, one would have to take the square root of the power, which is computationally expensive. Calculating the power or amplitude throws away all of the phase information. The sum-of-squares calculation is:

$$c^2 = \vec{c} \cdot \vec{c} = (\vec{a} + \vec{n}) \cdot (\vec{a} + \vec{n}) =$$
$$\vec{a} \cdot \vec{a} + 2\vec{a} \cdot \vec{n} + \vec{n} \cdot \vec{n} = a^2 + 2\vec{a} \cdot \vec{n} + n^2 = a^2 + 2an\cos\varphi + n^2$$

The magnitude of the sum-of-squares calculation is its square root:

$$c = \sqrt{a^2 + 2an\cos\varphi + n^2}$$

Where $\varphi$ is the phase angle of the instantaneous noise vector, relative to the phase angle of the uncorrupted signal.

The known-phase calculation is:

$$d = \hat{a} \cdot (\vec{a} + \vec{n}) = a + n\cos\varphi$$

Where $\hat{a}$ is the unit vector in the direction of $\vec{a}$.
The power of the known-phase calculation is its square:

$$d^2 = (a + n\cos\varphi)^2 = a^2 + 2an\cos\varphi + n^2\cos\varphi$$

The power calculations can be directly compared by noting that $$n^2 = n^2\cos^2\varphi + n^2\sin^2\varphi$$

Thus $$c^2 = a^2 + 2an\cos\varphi + n^2 = a^2 + 2an\cos\varphi + n^2\cos^2\varphi + n^2\sin^2\varphi$$

| Power Calculations | Equations |
| --- | --- |
| Sum-of-Squares | $c^2 = a^2 + 2an\cos\varphi + n^2\cos^2\varphi + n^2\sin^2\varphi$ |
| Known-Phase | $d^2 = a^2 + 2an\cos\varphi + n^2\cos^2\varphi$ |

The difference between the two power methods is $n^2 \sin^2 \varphi$, which is always non-negative. Therefore, the power calculated by the known-phase method will always be smaller than that calculated by the sum-of-squares method. Because the difference term contains only noise variables n and $\varphi$, and not the signal variable a, the difference is only composed of noise and its elimination makes the measurement closer to the true value of $a^2$.

The magnitude calculations can be similarly compared, but the result is less obvious because of the square root.

| Magnitude Calculations | Equations |
| --- | --- |
| Sum-of-Squares | $c = \sqrt{a^2 + 2an\cos\varphi + n^2}$ |
| Known-Phase | $d = a + n\cos\varphi$ |

In certain regimes, by introducing a signal-to-noise ratio variable $\gamma$, which is equal to $$\frac{n}{a},$$

the reciprocal of me signal-noise-ratio or 1/SNR, each of the equations becomes:

$$c^2 = a^2 + 2an\cos\varphi + n^2 = a^2\left(1 + 2\frac{n}{a}\cos\varphi + \left(\frac{n}{a}\right)^2\right) = a^2(1 + 2\gamma\cos\varphi + \gamma^2)$$

$$d^2 = a^2 + 2an\cos\varphi + n^2\cos^2\phi =$$
$$a^2\left(1 + 2\frac{n}{a}\cos\varphi + \left(\frac{n}{a}\right)^2\cos^2\varphi\right) = a^2(1 + 2\gamma\cos\varphi + \gamma^2\cos^2\varphi)$$

$$c = \sqrt{a^2 + 2an\cos\varphi + n^2} = a\sqrt{1 + 2\gamma\cos\varphi + \gamma^2}$$

$$d = a + n\cos\varphi = a\left(1 + \frac{n}{a}\cos\varphi\right) = a(1 + \gamma\cos\varphi)$$

The various regimes can be compared. The first of these is the time average, which can be determined by setting all of the sine and cosine terms to zero (but not their powers since they have to first be reduced to a non power form).

| Calculation | Complete | Time Average |
| --- | --- | --- |
| SoS Power | $c^2 = a^2(1 + 2\gamma\cos\varphi + \gamma^2)$ | $c^2 = a^2(1 + \gamma^2) = a^2 + n^2$ |
| KP Power | $d^2 = a^2(1 + 2\gamma\cos\varphi + \gamma^2\cos^2\varphi)$ | $d^2 = a^2\left(1 + \frac{1}{2}\gamma^2\right) = a^2 + \frac{1}{2}n^2$ |
| Sos Mag | $c = a\sqrt{1 + 2\gamma\cos\varphi + \gamma^2}$ | $c = a\sqrt{1+\gamma^2} = \sqrt{a^2 + n^2}$ |
| KP Mag | $d = a(1 + \gamma\cos\varphi)$ | $d = a$ |

The time average is the baseline of the measured signal, ignoring deviations from it. The power of the known-phase measurement has only half the noise contribution of the sum-of-squares measurement, and thus has a 3 dB SNR improvement. The time average of the sum-of-squares magnitude has a bias term and will always be larger than the time average of the known-phase measurement.

Note that the known-phase calculation ignores the noise component that is orthogonal to the known signal, i.e., the $n \sin \phi$ component of $\vec{n}$. That component contains only noise and none of the original signal, so there is zero utility in including it.

In an embodiment, further note that the 3 dB reduction in noise is an average, having been integrated over a large number of samples. An estimate of the original signal amplitude calculated with the known-phase technique may have just as much noise as an estimate that uses the sum-of-squares technique (if the noise vector happens to be parallel to the original signal vector), or no noise at all (if the noise vector happens to be perpendicular to the original signal vector). As long as the original signal phase is truly known, the known-phase technique will never produce a result with lower SNR than the sum-of-squares technique.

To determine the deviations from the time-averaged baseline, instantaneous calculations must be used and the sine and cosine terms cannot be omitted. Instead, the calculations in both the high- and low-SNR regimes are used to see how each is affected. Below is an examination of the high-SNR regime, in which n<<a and therefore $\gamma$<<1.

| Calculation | Complete | High SNR |
| --- | --- | --- |
| SoS Power | $c^2 = a^2(1 + 2\gamma\cos\varphi + \gamma^2)$ | $c^2 \approx a^2(1 + 2\gamma\cos\varphi)$ |
| KP Power | $d^2 = a^2(1 + 2\gamma\cos\varphi + \gamma^2\cos^2\varphi)$ | $d^2 \approx a^2(1 + 2\gamma\cos\varphi)$ |
| SoS Mag | $c = a\sqrt{1 + 2\gamma\cos\varphi + \gamma^2}$ | $c \approx a\sqrt{1 + 2\gamma\cos\varphi} \approx a(1 + \gamma\cos\varphi)$ |
| KP Mag | $d = a(1 + \gamma\cos\varphi)$ | $d \approx a(1 + \gamma\cos\varphi)$ |

Because $\gamma$<<1, $\gamma^2$<<$\gamma$ all $\gamma^2$ terms can be omitted if there are also $\gamma$ terms. After such omissions, however, there is no advantage of using the known-phase technique over the sum-of-squares technique, and vice versa. In the high-SNR regime, all of these techniques perform equally.

Below is an examination of the low-SNR regime, in which a<<n and therefore $\gamma>>1$ and $\gamma^2>>\gamma$.

| Calculation | Complete | High SNR |
|---|---|---|
| SoS Power | $c^2 = a^2(1 + 2\gamma\cos\varphi + \gamma^2)$ | $c^2 \approx n^2$ |
| KP Power | $d^2 = a^2(1 + 2\gamma\cos\varphi + \gamma^2\cos^2\varphi)$ | $d^2 \approx \frac{1}{2}n^2(1 + \cos 2\varphi)$ |
| Sos Mag | $c = a\sqrt{1+2\gamma\cos\varphi+\gamma^2}$ | $c \approx n$ |
| KP Mag | $d = a(1 + \gamma\cos\varphi)$ | $d \approx n \cos\varphi$ |

In the low-SNR regime, the signal a goes away and leaves only noise. The known-phase technique never produces more noise than the sum-of-squares technique, even on an instantaneous basis, and on average produces only half of the noise. On an instantaneous basis, the known-phase technique will sometimes produce the same amount of noise as the sum-of-squares technique, and sometimes will produce none.

In a real-world application, the SNR will be somewhere between the two extremes.

Exemplary Embodiment

To estimate the original signal power using a sum-of-squares technique, the complex value of the particular FFT output bin and A(f) are used to calculate:

$$\text{power estimate} = P_{SoS}(f) = \text{real}(A(f))^2 + \text{imag}(A(f))^2$$

The estimated amplitude is the square root of the power estimate.

In an embodiment, to estimate the original signal amplitude using the known-phase technique, the known phase is required. In another embodiment, this information can be obtained from design information, or can be measured directly from the touch system. In the presence of noise and interference, it would be best to average or otherwise statistically combine many values of the particular FFT output. In an embodiment, this may be done by averaging the real and imaginary components separately, so the known phase would therefore be:

$$\text{average known phase} = \varphi_k = a\tan 2(\text{mean}(\text{imag}(A(f))), \text{mean}(\text{real}(A(f))))$$

Then the known phase is converted to a unit vector with that phase:

$$\hat{u}_k = [\cos\varphi_k, \sin\varphi_k]$$

Taking the dot product of this unit vector with the incoming complex samples will yield the amplitude estimates at that frequency:

$$\text{amplitude estimate } Y_{KP}(f) = \text{real}(A(f))\cos\varphi_k + \text{imag}(A(f))\sin\varphi_k$$

The corresponding power estimate $P_{KP}(f) = (Y_{KP}(f))^2$. Note, as would be understood by one of skill in the art, the dot product operation above is half of the calculation for multiplication by a rotation matrix. It will also be apparent to one of skill in the art in view of this disclosure that other statistical combinations may be useful instead of average, such as, e.g., median, or mode, or other measure that reflects a characteristic of the values.

It should be noted that no trigonometric functions are required in the embedded system itself. These can be computed beforehand, either at design time or at calibration time, if they are needed at all. In fact, no trigonometric functions may be needed at all. The unit vector $\hat{u}_k = [\cos\varphi_k, \sin\varphi_k]$ is just the average of the real and imaginary values, which has then been normalized. If it is necessary for the unit vectors to be computed by the embedded device itself (during a power-on calibration interval, perhaps), the most expensive computation needed is a division operator for the normalization. The division operator must be done once for each row frequency and then is never used again.

Non-constant Signal Phase

Where the transmitted phase is not constant relative to the receiver, a touch on the sensor causes a phase change between the transmitter and receiver, or the phase was measured incorrectly, then that could result in the phase of the original signal not being constant or otherwise not matching the "known" phase used in the calculation.

Small phase differences make little difference in the final signal-to-noise ratio, however. The phase error would affect only the original signal, but not the noise (on average) because the angle between the noise and the signal is uncorrelated.

In an embodiment, using the known-phase technique, a phase difference of $\Delta\phi$ would lower the amplitude of the received signal by cos $\Delta\phi$, and therefore its power by $\cos^2\Delta\phi$. In another embodiment, a phase difference of 10 degrees would lower the measured SNR by 0.13 dB. In another embodiment, a difference of 30 degrees would lower the SNR by 1.25 dB and a difference of 45 degrees would lower the SNR by 3 dB. On average, use of the known-phase technique will have an SNR advantage as long as the average phase error does not exceed 45 degrees.

In an embodiment, use of the known-phase technique to compute the estimated amplitude of a transmitted signal will provide an average SNR improvement of 3 dB, while requiring approximately the same amount of computational resources as the existing sum-of-squares technique. Even fewer resources are required if amplitude results are preferred over power results because the amplitude is calculated directly with no need to compute a square root.

In an embodiment, the only additional resources required are the measurement of the known signal phases, which can be calculated at design time or measured after a device is built, and two memory storage location per used FFT frequency bin. Each storage location must be able to hold a scalar with value between −1 and +1.

Any of the resulting measurements can be a measurement of power, a measurement of amplitude, or is proportional to a measurement of amplitude.

In an embodiment, the touch detector is comprised of one or more rows and one or more columns of conductive material, at least one signal emitter, at least one receiver, and at least one signal processor.

In some exemplary embodiments, the rows and columns are arranged in a matrix of rows and columns of conductive material. In another embodiment, the touch detector contains first and second row conductors, and a column conductor, arranged such that the path of the first and second row conductors cross the path of the column conductor. In another embodiment, the touch detector contains at least one first row conductor and at least one first column conductor arranged such that the path of the first row conductor crosses the path of the first column conductor.

In another embodiment, a first row conductor and a first column conductor arranged such that the path of the first row conductor crosses the path of the first column conductor. Additionally, at least one additional row conductor is present, and is arranged such that the path of the at least one additional row conductor crosses the path of the first column conductor. Additionally, the at least one additional row conductor is a plurality of additional row conductors, and each of the plurality of additional row conductors are arranged such that the path of each of the plurality of additional row conductors crosses the path of the first column conductor. In another embodiment, there is at least one additional column conductor arranged such that the path of the at least one additional column conductor crosses the path of the first row conductor and the path of the at least one additional row conductor. In an embodiment, there is at least one additional column conductor, the one additional column conductor being arranged such that the path of the at least one additional column conductor crosses the path of the first row conductor. In another embodiment, the at least one additional column conductor is a plurality of additional column conductors, and each of the plurality of additional column conductors are arranged such that the path of each of the plurality of additional column conductors crosses the path of the first row conductor. In another embodiment, the at least one additional row conductor is arranged such that the path of the at least one additional row conductor crosses the paths of the first column conductor and the path of the at least one additional column conductor.

The known-phase technique is compatible with, and may be advantageous for use in connection with, certain touch sensor technology, including but not limited to those various methods and apparatus disclosed in the U.S. Patent Applications identified in the first paragraph of this Detailed Description.

The present systems and methods are described above with reference to block diagrams and operational illustrations of methods and devices for frequency conversion and heterodyning. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While the invention has been particularly shown and described with reference to a preferred embodiment thereof, it will be understood by those skilled in the art that various changes in form and details may be made therein without departing from the spirit and scope of the invention.

What is claimed is:

1. A touch detector with an improved signal to noise ratio for connection with a touch surface having a first set of conductors and a second set of conductors, the touch detector comprising:
    signal emitter adapted to transmit a unique one of a plurality of original signals onto each of the first set of conductors, each of the plurality of original signals having a respective initial phase and a respective frequency, and each of the original signals being frequency orthogonal to each of the other original signals;
    receiver associated with each of the second set of conductors, to receive signals present on the second set of conductors; and
    signal processor being adapted to: (i) for each received signal, determine an in-phase and a quadrature component for the respective frequencies of each of the plurality of original signals, each pair of in-phase and quadrature components defining a vector reflecting a component of the received signal at the respective frequency; and (ii) determine an estimate for each of the respective frequencies by computing a dot product of a unit vector representing each original signal at its corresponding respective phase and the vector represented by the determined in-phase and quadrature components; and (iii) identify touch on the touch surface based on the estimates.

2. The touch detector according to claim 1, wherein the signal processor and the receiver are part of the same component.

3. The touch detector according to claim 1, wherein the signal processor and the receiver are not part of the same component.

4. The touch detector according to claim 1, wherein the respective initial phase of one of the plurality of original signals is different than the respective initial phase of another of the plurality of original signals.

5. The touch detector according to claim 4, wherein the respective initial phase of the one of the plurality of original signals is the same as the respective initial phase of yet another of the plurality of original signals.

6. The touch detector according to claim 1, wherein the respective initial phase of one of the plurality of original signals is the same as the respective initial phase of another of the plurality of original signals.

7. A touch detector, comprising:
    first and second row conductors, and a column conductor, arranged such that the capacitive effect of bringing a finger into proximity causes a change in coupling between the column conductor and at least one of the first and second row conductors;
    first and second signal emitters respectively adapted to transmit a first signal having a first frequency at a first phase on the first row conductor and a second signal having a second frequency at a second phase on the second row conductor, each of the first and second signals being orthogonal to the other;
    receiver associated with the column conductor, to receive signals present on the column conductor;
    signal processor being adapted to:
        determine an in-phase and a quadrature component of the first and second frequencies in the received signals;
        determine a first estimate for the first frequency by computing a dot product of a first vector representing the first frequency at its corresponding first phase and the vector represented by the determined in-phase and quadrature components of the first frequency;
        determine a second estimate for the second frequency by computing a dot product of a second vector representing the second frequency at its corresponding second phase and the vector represented by the determined in-phase and quadrature components of the second frequency; and
        detect touch based on the first and second estimates.

8. The touch detector according to claim 7, wherein the signal processor and the receiver are part of the same component.

9. The touch detector according to claim 7, wherein the signal processor and the receiver are not part of the same component.

10. The touch detector according to claim 7, wherein at least one of the first and second estimates is an estimate of power.

11. The touch detector according to claim 7, wherein at least one of the first and second estimates is an estimate of amplitude.

12. The touch detector according to claim 7, wherein at least one of the first and second estimates is proportional to an estimate of amplitude.

13. The touch detector according to claim 7,
wherein the signal processor comprises more than one signal processor units, each of the signal processor units adapted to perform at least one of the following operations:
determine an in-phase and a quadrature component of the first and second frequencies in the received signals;
determine a first estimate for the first frequency by computing a dot product of a first vector representing the first frequency at its corresponding first phase and the vector represented by the determined in-phase and quadrature components of the first frequency;
determine a second estimate for the second frequency by computing a dot product of a second vector representing the second frequency at its corresponding second phase and the vector represented by the determined in-phase and quadrature components of the second frequency; and
detect touch based on the first and second estimates; and
all of the one or more signal processor units, collectively, perform all of the operations.

14. The touch detector according to claim 13, wherein at least one of the first and second estimates is an estimate of power.

15. The touch detector according to claim 13, wherein at least one of the first and second estimates is an estimate of amplitude.

16. The touch detector according to claim 13, wherein at least one of the first and second estimates is proportional to an estimate of amplitude.

17. A touch detector, comprising:
a first row conductor and a first column conductor arranged such that the path of the first row conductor crosses the path of the first column conductor;
signal emitter adapted to transmit a first signal having a first frequency at a first phase on the first row conductor;
receiver associated with the first column conductor, to receive signals present on the first column conductor;
signal processor being adapted to:
determine an in-phase and a quadrature component of the first frequency in the signals received on the first column conductor, the in-phase and quadrature components defining a vector reflecting a component of the received signal at the first frequency; and
determine an estimate related to touch for the first frequency by computing a dot product of a unit vector representing the first frequency at the first phase and the vector represented by the determined in-phase and quadrature components.

18. The touch detector according to claim 17, wherein the estimate related to touch is an estimate of a power.

19. The touch detector according to claim 17, wherein the estimate related to touch is an estimate of amplitude.

20. The touch detector according to claim 17, wherein the estimate related to touch is proportional to an estimate of amplitude.

21. The touch detector according to claim 17, wherein the signal processor comprises one or more signal processor units, each of the one or more signal processor units is adapted to perform at least one of the following operations:
determine an in-phase and a quadrature component of the first frequency in the received signals; and
determine an estimate related to touch for the first frequency by computing a dot product of a unit vector representing the first frequency at the first phase and the vector represented by the determined in-phase and quadrature components; and
all of the one or more signal processor units, collectively, perform both of the operations.

22. The touch detector according to claim 21, wherein the estimate is an estimate of a power.

23. The touch detector according to claim 21, wherein the estimate is an estimate of amplitude.

24. The touch detector according to claim 21, wherein the estimate is proportional to an estimate of amplitude.

25. The touch detector according to claim 17, further comprising at least one additional row conductor, the at least one additional row conductor being arranged such that the path of the at least one additional row conductor crosses the path of the first column conductor.

26. The touch detector according to claim 25, wherein the at least one additional row conductor is a plurality of additional row conductors, and each of the plurality of additional row conductors are arranged such that the path of each of the plurality of additional row conductors crosses the path of the first column conductor.

27. The touch detector according to claim 25, wherein there is at least one additional column conductor arranged such that the path of the at least one additional column conductor crosses the path of the first row conductor and the path of the at least one additional row conductor.

28. The touch detector according to claim 25, wherein the signal emitter is further adapted to transmit at least one additional signal having at least one additional frequency at et least one additional phase on the at least one additional row conductor, respectively, such that the signal emitter transmits a plurality of unique orthogonal signals, each of the unique orthogonal signals being orthogonal to each of the other unique orthogonal signals.

29. The touch detector according to claim 17, further comprising at least one additional column conductor, the one additional column conductor being arranged such that the path of the at least one additional column conductor crosses the path of the first row conductor.

30. The touch detector according to claim 29, wherein:
the receiver is further associated with the at least one additional column conductor, to receive signals present on the at least one additional column conductor, and
the signal processor is further adapted to:
determine an in-phase and a quadrature component of the first frequency in the signals received on the at least one additional column conductor;
determine another estimate related to touch for the first frequency by computing a dot product of a unit vector representing the first frequency at the first phase and the vector represented by the in-phase and quadrature components determined for the signals received on the at least one additional column conductor; and identify touch based on the estimate and the another estimate.

31. The touch detector according to claim 30, wherein the another amplitude estimate related to touch is an estimate of a power.

32. The touch detector according to claim 30, wherein the another amplitude estimate related to touch is an estimate of amplitude.

33. The touch detector according to claim 30, wherein the another amplitude estimate related to touch is proportional to an estimate of amplitude.

34. The touch detector according to claim 29, wherein the at least one additional column conductor is a plurality of additional column conductors, and each of the plurality of additional column conductors are arranged such that the path of each of the plurality of additional column conductors crosses the path of the first row conductor.

35. The touch detector according to claim 29, further comprising at least one additional row conductor arranged such that the path of the at least one additional row conductor crosses the paths of the first column conductor and the path of the at least one additional column conductor.

36. The touch detector according to claim 35, wherein the signal emitter is further adapted to transmit at least one additional signal having at least one additional frequency at et least one additional phase on the at least one additional row conductor, respectively, such that the signal emitter transmits a plurality of unique orthogonal signals, each of the unique orthogonal signals being orthogonal to each of the other unique orthogonal signals.

37. A method for detecting touch information on a touch detector, the touch detector comprising first and second row conductors, at least one column conductor, arranged such that the capacitive effect of bringing a finger into proximity causes a change in coupling between the column conductor and at least one of the first and second row conductors, the touch detector further comprising a receiver associated with at least one column conductor, and at least one signal processor, the method comprising:

transmitting a first and second signal over the first and second row conductors, respectively, the first signal being at a first frequency and a first phase, and the second signal being at a second frequency and a second phase, wherein the first and second frequencies are orthogonal to each other;

receiving signals present on the column conductor;

determining an in-phase and a quadrature component of the first frequency in the received signal, the in-phase and quadrature components of the first frequency defining a first vector reflecting a component of the received signal at the first frequency;

determine a first estimate for the first frequency by computing a dot product of a vector representing the first signal at the first phase and the first vector;

determining an in-phase and a quadrature component of the second frequency in the received signal, the in-phase and quadrature components of the second frequency defining a second vector reflecting a component of the received signal at the second frequency;

determine a second estimate for the second frequency by computing a dot product of a second vector representing the second signal at the second phase and the second vector; and creating a matrix reflecting the detected estimates.

38. The method of claim 37, further comprising using the matrix to determine touch.

39. The method of claim 37, further comprising:

repeating the transmitting step, the receiving step, the four determining steps and the creating step, and using sequential matrices to detect touch.

40. A method for detecting a touch event on a touch detector, the touch detector comprising first and second row conductors, at least one column conductor, arranged such that the capacitive effect of bringing a finger into proximity causes a change in coupling between the column conductor and at least one of the first and second row conductors, the touch detector further comprising a receiver associated with at least one column conductor, and at least one signal processor, the method comprising:

transmitting a first and second signal over the first and second row conductors, respectively, the first signal being at a first frequency and a first phase, and the second signal being at a second frequency and a second phase, wherein the first and second frequencies are orthogonal to each other;

receiving signals present on the column conductor; and determining changes in an amount of each of the first and the second signal present in the received signal;

identifying a touch event based upon the change in the amount of at least one of the first and second signal present in the received signals;

wherein the step of determining changes in the amount of each of the first and the second signal present in the received signal comprises:

determining an in-phase and a quadrature component of the first frequency in the received signals at a first time and determining a first estimate related to touch for the first frequency by computing a dot product of a unit vector representing the first frequency at the first phase and the vector represented by the determined in-phase and quadrature components of the first frequency in the received signal at the first time;

determining an in-phase and a quadrature component of the second frequency in the received signals at the first time and determining a first estimate related to touch for the second frequency by computing a dot product of a unit vector representing the second frequency at the second phase and the vector represented by the determined in-phase and quadrature components of the second frequency in the received signal at the first time;

determining an in-phase and a quadrature component of the first frequency in the received signals at a second time and determining a second estimate related to touch for the first frequency by computing a dot product of a unit vector representing the first frequency at the first phase and the vector represented by the determined in-phase and quadrature components of the first frequency in the received signal at the second time;

determining an in-phase and a quadrature component of the second frequency in the received signals at a second time and determining a second estimate related to touch for the second frequency by computing a dot product of a unit vector representing the second frequency at the second phase and the vector represented by the determined in-phase and quadrature components of the second frequency in the received signal at the second time; and comparing the first estimate related to touch for the first frequency with the second estimate related to touch for the first frequency, and comparing the first estimate related to touch for the second frequency with the second estimate related to touch for the second frequency, thereby determining changes in the amount of each of the first and the second signal present in the received signal.

41. The method of claim 40, wherein at least one of the first estimate related to touch for the first frequency, the second estimate related to touch for the first frequency, the first estimate related to touch for the second frequency, and the second estimate related to touch for the second frequency, is an estimate of power.

42. The method of claim 40, wherein at least one of the first estimate related to touch for the first frequency, the second estimate related to touch for the first frequency, the first estimate related to touch for the second frequency, and the second estimate related to touch for the second frequency, is an estimate of amplitude.

43. The method of claim 40, wherein at least one of the first estimate related to touch for the first frequency, the second estimate related to touch for the first frequency, the first estimate related to touch for the second frequency, and the second estimate related to touch for the second frequency, is proportional to an estimate of amplitude.

44. A touch detector comprising:
first and second row conductors, and a column conductor, arranged such that the path of the first and second row conductors cross the path of the column conductor;
first and second signal emitters each adapted to simultaneously transmit one of a first and second signal on each of the first and second row conductors, respectively;
each of the two signals being non-orthogonal to the other, the first signal differing from the second signal in one selected from the group of: phase and amplitude;
receiver associated with the column conductor, to receive signals present on the column conductor;
signal processor being adapted to:
determine an in-phase and a quadrature component of a combination of the first and second signals in the received signals, the in-phase and quadrature components defining a combined vector;
determine a measurement related to touch for at least one of the two signals by computing a dot product of a vector representing one of the two signals at its phase and the combined vector; and
create a heat map reflecting touch using the measurement.

45. The touch detector according to claim 44, wherein the first and second signal emitters transmit other signals in conjunction with the first and second signal on each of the first and second row conductor.

46. The touch detector according to claim 44, wherein there is at least one additional row, the at least one additional row conductor arranged such that the path of the at least one additional row conductor crosses the path of the column conductor.

47. The touch detector according to claim 44, wherein there is at least one additional column conductor, the at least one additional column conductor arranged such that it crosses the path of the first and second row conductor.

* * * * *